US012712376B2

(12) United States Patent
Ha et al.

(10) Patent No.: US 12,712,376 B2
(45) Date of Patent: Aug. 18, 2026

(54) BATTERY CHARGING METHOD AND ELECTRONIC APPARATUS SUPPORTING SAME

(71) Applicant: SAMSUNG ELECTRONICS CO., LTD., Suwon-si (KR)

(72) Inventors: Youngmi Ha, Suwon-si (KR); Yeongil Kim, Suwon-si (KR); Hyunjun Oh, Suwon-si (KR); Sungjoon Cho, Suwon-si (KR); Jaemu Ha, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 730 days.

(21) Appl. No.: 18/091,930

(22) Filed: Dec. 30, 2022

(65) Prior Publication Data

US 2023/0142984 A1 May 11, 2023

Related U.S. Application Data

(63) Continuation of application No. PCT/KR2021/008343, filed on Jul. 1, 2021.

(30) Foreign Application Priority Data

Jul. 3, 2020 (KR) ........................ 10-2020-0082411

(51) Int. Cl.
*H02J 7/96* (2026.01)
*H01M 10/44* (2006.01)
(Continued)

(52) U.S. Cl.
CPC ............... *H02J 7/96* (2026.01); *H01M 10/44* (2013.01); *H01M 10/46* (2013.01); *H02J 7/80* (2026.01); *H02J 7/94* (2026.01)

(58) Field of Classification Search
CPC ............... H02J 7/007182; H02J 7/0047; H02J 7/00714; H02J 7/0071; H02J 7/00712;
(Continued)

(56) References Cited

U.S. PATENT DOCUMENTS 7,394,224 B2 7/2008 Wanibuchi et al.
9,246,344 B2 1/2016 Suzuki et al.
(Continued)

FOREIGN PATENT DOCUMENTS

JP 3545597 B2 7/2004
JP 2009-22078 A 1/2009
(Continued)

OTHER PUBLICATIONS

International Search Report (PCT/ISA/210) dated Oct. 25, 2021 issued by the International Searching Authority in International Application No. PCT/KR2021/008343.
(Continued)

*Primary Examiner* — Nha T Nguyen
(74) *Attorney, Agent, or Firm* — Sughrue Mion, PLLC

(57) ABSTRACT

An electronic device includes a battery and a processor configured to, while maintaining a charging current at a first constant current, identify whether a charging voltage reaches a first target voltage, based on identifying that the charging voltage has reached the first target voltage, convert the charging current to a first charging current, identify whether the charging current reaches a first target current, and based on identifying that the charging current has reached the first target current, convert the charging current to a second constant current corresponding to the first target current.

20 Claims, 8 Drawing Sheets

(51) Int. Cl.
*H01M 10/46* (2006.01)
*H02J 7/80* (2026.01)
*H02J 7/94* (2026.01)

(58) Field of Classification Search
CPC ........ H02J 7/96; H02J 7/80; H02J 7/94; H02J 7/92; H02J 7/933; H01M 10/44; H01M 10/46; G01R 19/165; G01R 31/382; G01R 31/392; G01R 19/16542; Y02E 60/10
See application file for complete search history.

(56) References Cited

U.S. PATENT DOCUMENTS

| | | | | |
|---|---|---|---|---|
| 11,056,903 | B2 | 7/2021 | Lim et al. | |
| 11,539,229 | B2 * | 12/2022 | Zhang | H02J 7/0047 |
| 11,894,710 | B2 * | 2/2024 | Uesugi | H02J 7/007182 |
| 12,412,465 | B1 * | 9/2025 | Daoura | G08B 21/24 |
| 2011/0012563 | A1 | 1/2011 | Paryani et al. | |
| 2012/0086406 | A1 | 4/2012 | Maeagawa | |
| 2014/0253023 | A1 | 9/2014 | Paryani et al. | |
| 2015/0077058 | A1 | 3/2015 | Jung et al. | |
| 2015/0171644 | A1 * | 6/2015 | Paryani | H02J 7/007184 320/137 |
| 2018/0226695 | A1 | 8/2018 | Miyaki et al. | |
| 2018/0316206 | A1 | 11/2018 | Luo et al. | |
| 2019/0229547 | A1 * | 7/2019 | Lim | H01M 10/44 |
| 2020/0106284 | A1 * | 4/2020 | Zhang | H02J 7/007182 |
| 2021/0048479 | A1 | 2/2021 | Hyun et al. | |
| 2021/0376638 | A1 * | 12/2021 | Yen | H01M 10/443 |

FOREIGN PATENT DOCUMENTS

| | | | |
|---|---|---|---|
| JP | 2011-24412 | A | 2/2011 |
| JP | 4768090 | B2 | 9/2011 |
| JP | 5400333 | B2 | 1/2014 |
| JP | 2018-68081 | A | 4/2018 |
| JP | 6627878 | B2 | 1/2020 |
| JP | 7035591 | B2 | 3/2022 |
| KR | 10 2012 0028350 | A | 3/2012 |
| KR | 10-1502230 | B1 | 3/2015 |
| KR | 10-2015-0050215 | A | 5/2015 |
| KR | 10-2016-0095752 | A | 8/2016 |
| KR | 10-1836370 | B1 | 3/2018 |
| KR | 10 2019 0090474 | A | 8/2019 |
| KR | 10-2019-0101582 | A | 9/2019 |
| WO | 2020/166815 | A1 | 8/2020 |

OTHER PUBLICATIONS

Written Opinion (PCT/ISA/237) dated Oct. 25, 2021 issued by the International Searching Authority in International Application No. PCT/KR2021/008343.

Communication issued on Dec. 4, 2023 by the European Patent Office in European Application No. 21833440.7.

Communication dated Apr. 22, 2025 issued by the Korean Intellectual Property Office in Korean Patent Application No. 10-2020-0082411.

Communication dated Apr. 10, 2026, issued by the Korean Ministry of Intellectual Property in Korean Application No. 10-2020-0082411.

* cited by examiner

BATTERY CHARGING METHOD AND ELECTRONIC APPARATUS SUPPORTING SAME

CROSS-REFERENCE TO RELATED APPLICATIONS

This application is a bypass continuation of International Application No. PCT/KR2021/008343, filed on Jul. 1, 2021, in the Korean Intellectual Property Receiving Office, which is based on and claims priority to Korean Patent Application No. 10-2020-0082411, filed on Jul. 3, 2020, in the Korean Intellectual Property Office, the disclosures of which are incorporated herein by reference in their entireties.

BACKGROUND

1. Field

The disclosure relates to a battery charging method and an electronic device supporting same.

2. Description of Related Art

Recently, demand for batteries is growing due to the increase of demand for portable electronic devices. A battery is an energy storage device converting energy generated by chemical reaction into electric energy and using same, and a primary cell, a secondary cell, and a fuel cell belong to such a battery. Generally, a battery that, after making a reaction, does not react again and is thus not reusable even when electric energy is applied thereto again, may be referred to as a primary battery, and a battery that allows repetitive reversible reactions and is thus continuously usable may be referred to as a secondary battery.

In the related art, in order to charge a battery in a short time, multiple charging intervals before the battery capacity reaches a fully-charged state are configured, and different charging currents are configured for the configured charging intervals. The charging current may have a value which changes even in a single charging interval according to a constant current (CC) interval and a constant voltage (CV) interval.

A battery of an electronic device may be in a deteriorated state due to an external cause (e.g., temperature) or an internal cause (e.g., increase in consumed current). In the deteriorated state of the battery, the battery may reach early a time point of entering a CV interval from a CC interval in multiple charging intervals. In addition, in the deteriorated state of the battery, the battery may enter a CV interval quickly in each of the multiple charging intervals due to the impedance increase, and thus the charging current may decrease compared to a CC interval.

Due to the above causes, even though the battery voltage satisfies a condition for entrance into the next charging interval and the charging current is reduced enough to satisfy a condition for entrance into the next interval, the battery may fail to satisfy a condition of the state of charge (SoC) and may be thus unable to immediately enter the next charging interval.

SUMMARY

Provided are a battery charging method and an electronic device supporting same, for configuring multiple charging intervals reflecting the state of charge of a battery, based on a target current and/or a target voltage of each charging interval.

Additional aspects will be set forth in part in the description which follows and, in part, will be apparent from the description, or may be learned by practice of the presented embodiments.

According to an aspect of the disclosure, an electronic device includes a battery and a processor configured to, while maintaining a charging current at a first constant current, identify whether a charging voltage reaches a first target voltage, based on identifying that the charging voltage has reached the first target voltage, convert the charging current to a first charging current, identify whether the charging current reaches a first target current, and based on identifying that the charging current has reached the first target current, convert the charging current to a second constant current corresponding to the first target current.

The processor may be further configured to, based on identifying that the charging voltage has reached the first target voltage, convert the charging voltage to a first constant voltage corresponding to the first target voltage, and while the first constant voltage is maintained, identify whether the charging current reaches the first target current.

The processor may be further configured to, based on a current consumed in the electronic device, identify whether the charging current reaches the first target current.

The processor may be further configured to designate multiple charging intervals, based on at least one of multiple target voltages including the first target voltage and multiple target currents including the first target current.

The processor may be further configured to distinguish the multiple charging intervals independent of a state of charge (SoC) of the battery.

The multiple charging intervals may include a first charging interval and a second charging interval, and the processor may be further configured to, based on the charging current being converted to the second constant current, enter the second charging interval after the first charging interval.

The processor may be further configured to, based on the second charging interval being entered into from the first charging interval, convert the charging voltage to a second charging voltage while the second constant current is maintained in the second charging interval, and maintain the charging current at the second constant current while the second charging voltage is maintained.

A first time point from entering the second charging interval may be earlier than a second time point at which the charging current is converted from the first charging current into the second constant current.

The processor may be further configured to, identify whether at least one count among a charging count and a discharging count of the battery corresponds to a designated number, and based on identifying that the at least one count corresponds to the designated number, adjust at least one of the multiple target voltages and the multiple target currents for each of the multiple charging intervals.

The first target current may have a current lower than the first constant current.

According to an aspect of the disclosure, a method of charging a battery includes identifying whether a charging voltage reaches a first target voltage while maintaining a charging current at a first constant current, based on identifying that the charging voltage has reached the first target voltage, converting the charging current into a first charging current, identifying whether the charging current reaches a first target current, and based on identifying that the charging current has reached the first target current, converting the charging current from the first charging current to a second constant current corresponding to the first target current.

The identifying of whether the charging current reaches the first target current may include, based on identifying that the charging voltage has reached the first target voltage, converting the charging voltage to a first constant voltage corresponding to the first target voltage, and while the first constant voltage is maintained, identifying whether the charging current reaches the first target current.

The identifying of whether the charging current reaches the first target current may include identifying whether the charging current reaches the first target current, based on a current consumed in an electronic device.

The method may include designating multiple channel intervals based on at least one of multiple target voltages including a first target voltage, and multiple target currents including the first target current.

The designating of the multiple charging intervals may include distinguishing the multiple charging intervals independent of a SoC of the battery.

BRIEF DESCRIPTION OF DRAWINGS

The above and other aspects, features, and advantages of certain embodiments of the present disclosure will be more apparent from the following description taken in conjunction with the accompanying drawings, in which.

In relation to the description of the drawings, identical or corresponding elements may be provided with identical reference numerals.

DETAILED DESCRIPTION

Hereinafter, various embodiments of the disclosure will be described with reference to the accompanying drawings. However, the disclosure is not limited to these embodiments, and it should be understood that the disclosure includes various modifications, equivalents, and/or alternatives of the disclosed embodiments.

According to various embodiments disclosed herein, by a battery charging method and an electronic device supporting same, multiple charging intervals reflecting the state of charge of a battery are configured based on a target current and/or a target voltage of each charging interval so as to shorten the charging time of the battery according to the deterioration state of the electronic device.

In addition, according to various embodiments disclosed herein, by a battery charging method and an electronic device supporting same, different target currents and/or target voltages are configured for multiple charging intervals, based on a charging count and/or a discharging count of a battery, so as to reduce the deterioration of the battery.

Figure 1:
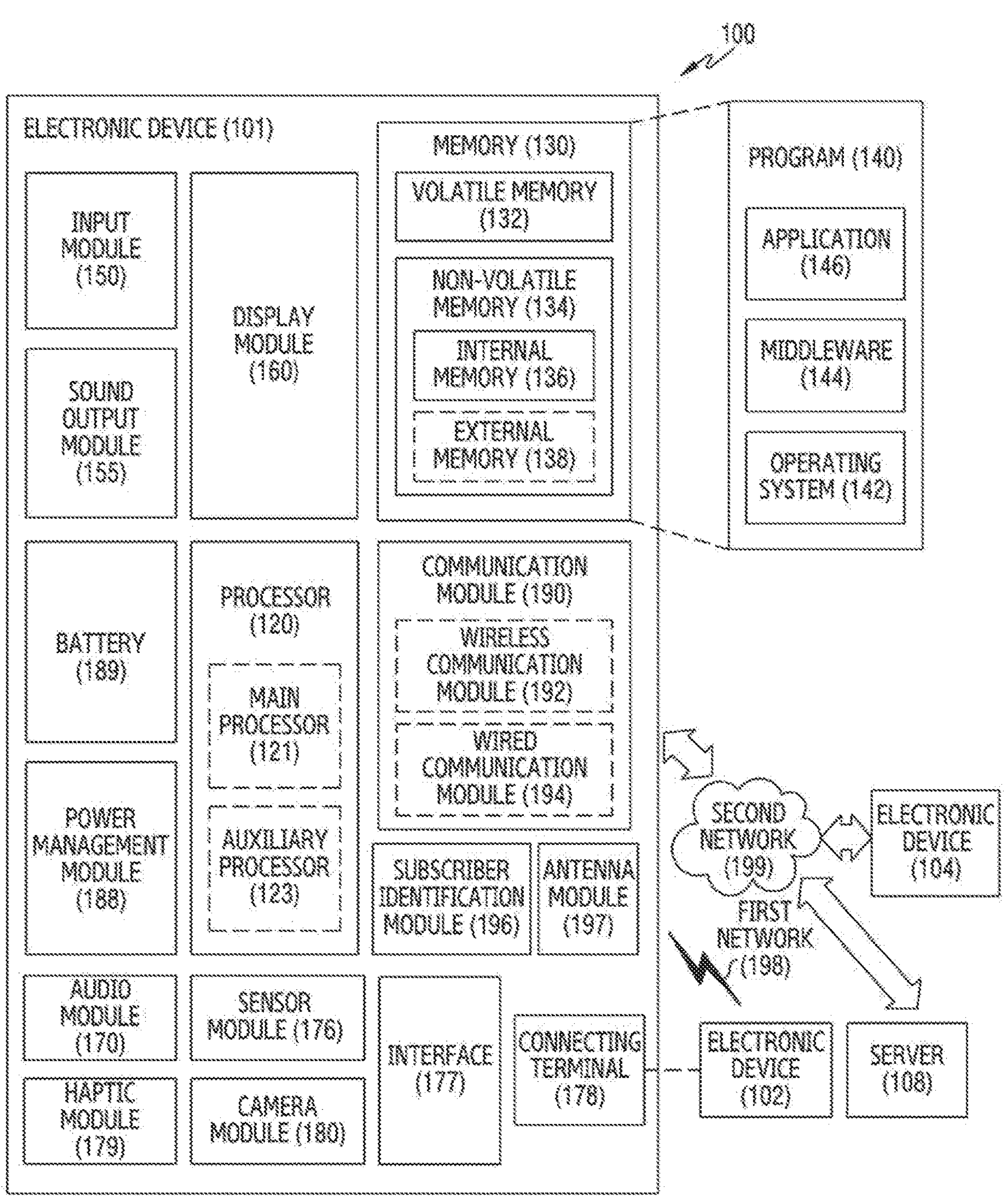
FIG. 1 is a block diagram illustrating an electronic device in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
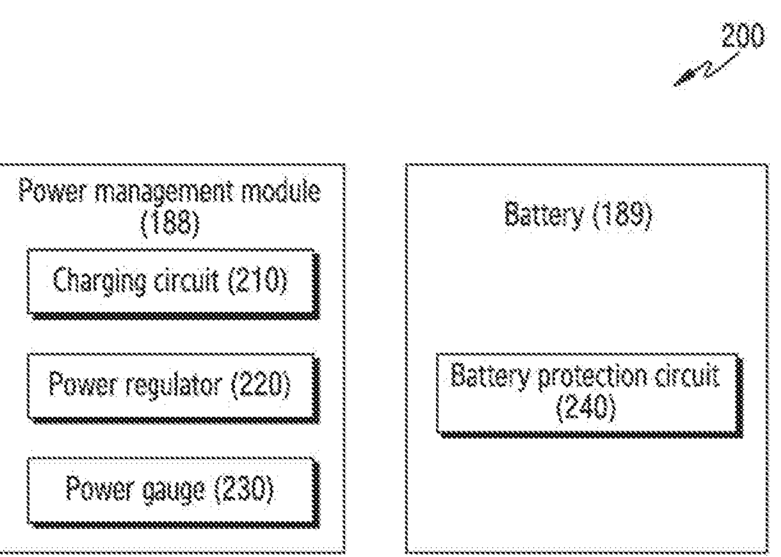
FIG. 2 is a diagram of a power management module and a battery according to an embodiment.

FIG. 2 is a diagram of a power management module and a battery according to an embodiment.

Referring to FIG. 2, the power management module 188 (e.g., the power management module 188 in FIG. 1) may include a charging circuit 210, a power regulator 220, or a power gauge 230. The charging circuit 210 may charge the battery 189 (e.g., the battery 189 in FIG. 2) by using the power supplied from an external power source for an electronic device (e.g., the electronic device 101 in FIG. 1). In an embodiment, the charging circuit 210 may select a charging scheme (e.g., normal charging or quick charging), based on at least some of the type (e.g., a power adapter, a USB, or wireless charging) of an external power source, the magnitude (e.g., about 20 watts or higher) of power suppliable from the external power source, or an attribute of the battery 189, and may charge the battery 327 by using the selected charging scheme. An external power source may be connected to the electronic device 101 via, for example, a connection terminal (e.g., the connecting terminal 178 in FIG. 1) by wire, or may be connected thereto via an antenna module (e.g., the antenna module 197 in FIG. 1) wirelessly.

The power regulator 220 may, for example, adjust a voltage level or a current level of the power supplied from an external power source or the battery 189, to generate multiple powers having different voltages or different current levels. The power regulator 220 may adjust the power of the external power source or the battery 189 to have voltage or current levels suitable for respective some elements among the elements included in the electronic device 101. In an embodiment, the power regulator 220 may be implemented in a type of a low drop out (LDO) regulator or a switching regulator. The power gauge 230 may measure usage state information for the battery 189 (e.g., the capacity, the charging/discharging count, the voltage, or the temperature of the battery 189).

The power management module 188 may use, for example, the charging circuit 210, the power regulator 220, or the power gauge 230 to determine battery state information (e.g., lifetime, overvoltage, low voltage, overcurrent, overcharge, overdischarge, overheat, short circuit, or swelling) related to charging of the battery 189, at least partially based on the measured usage state information. The power management module 188 may determine whether the battery 189 is normal or abnormal, at least partially based on the determined battery state information. When it is determined that the state of the battery 189 is normal, the power management module 188 may adjust (e.g., reduce the charging current or voltage or stop charging) charging of the battery 189. In an embodiment, at least some of the functions of the power management module 188 may be performed by an external controller (e.g., the processor 120 in FIG. 1).

The battery 189 may include a battery protection circuit (protection circuit module (PCM)) 240 in an embodiment. The battery protection circuit 240 may perform one or more of various functions (e.g., a pre-cutoff function) for prevention performance degradation of or damage to the battery 189. The battery protection circuit 240 may be additionally or alternatively configured as at least a part of a battery management system (BMS) capable of performing various functions including cell balancing, battery capacity measurement, charging/discharging count measurement, temperature measurement, or voltage measurement.

In an embodiment, at least part of the usage state information or the battery state information of the battery 189 may be measured using a corresponding sensor (e.g., a temperature sensor) in a sensor module (e.g., the sensor module 176 in FIG. 1), the power gauge 230, or the power management module 188. In an embodiment, the corresponding sensor (e.g., a temperature sensor) in the sensor module 176 may be included as a part of the battery protection circuit 240, or may be disposed near the battery 189 as a separate device.

Figure 3:
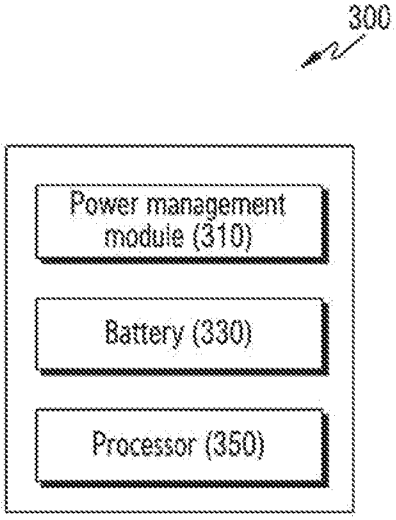
FIG. 3 is a diagram of an electronic device according to an embodiment.

FIG. 3 is a diagram of an electronic device according to an embodiment.

Referring to FIG. 3, an electronic device 300 (e.g., the electronic device 101 in FIG. 1) may charge a battery 330 (e.g., the battery 189 in FIG. 1), based on the power supplied from the outside (e.g., a charger). In an embodiment, the battery 330 may be in a deteriorated state according to an external cause (e.g., temperature) or an internal cause (e.g., increase in consumed current). The electronic device 300 may configure multiple charging intervals, based on a target current and/or target voltage of each charging interval in multiple charging intervals configured based on the state of charge (SoC) of the battery 330. For example, the electronic device 300 may adjust a target current for reaching a designated state of charge (e.g., a state of charge of about 30%) of one charging interval among multiple charging intervals regardless of the designated state of charge. Accordingly, the electronic device 300 may reduce delay of the charging time of the battery 330 due to impedance increase when the battery 330 is in a deteriorated state.

According to an embodiment, the SoC of the battery 330 may indicate an energy amount stored in the battery. The energy amount may be, for example, a ratio between a total capacity and a charge amount extractable from a cell at a particular time point. In an embodiment, the SoC of the battery 330 may be calculated by measuring at least one of the voltage, the current, the resistance, the temperature, the charging count, and the discharging count of the battery.

The electronic device 300 for providing the above functions may include a power management module 310, the battery 330, and a processor 350 with reference to FIG. 3. However, the element of the electronic device 300 is not limited thereto. In various embodiments, the electronic device 300 may exclude at least one of the above elements or may further include at least another element. For example, the electronic device 300 may further include a communication circuit (e.g., the communication module 190 in FIG. 1).

According to an embodiment, the power management module 310 (e.g., the power management module 188 in FIG. 1) may manage the power supplied to the electronic device 300. In an embodiment, the power management module 310 may charge the battery 330 by using the power supplied from the outside. In an embodiment, the power management module 310 may control charging and discharging of the battery 330. In an embodiment, the power management module 310 may supply the power supplied from the battery 330 or the outside, to an internal circuit of the electronic device 300. In an embodiment, the power management module 310 may correspond to at least one of a PMIC and a charging circuit.

In an embodiment, the power management module 310 may use a charging circuit (e.g., the charging circuit 210 in FIG. 2), a power regulator (e.g., the power regulator 220 in FIG. 2), or a power gauge (e.g., the power gauge 230 in FIG. 2) to determine battery state information (e.g., lifetime, overvoltage, low voltage, overcurrent, overcharge, overdischarge, overheat, short and/or swelling)) related to charging of the battery 189. In an embodiment, the power management module 310 may adjust a voltage level or a current level of the power supplied from the outside or the battery 330, to generate multiple powers having different voltages or different current levels. According to an embodiment, the power management module 310 may adjust the power of the outside or the battery 330 to have voltage or current levels suitable for respective elements included in the electronic device 300. In an embodiment, the power management module 310 may measure usage state information for the battery 330 (e.g., the capacity, the charging/discharging count, the voltage, and/or the temperature of the battery 330). In an embodiment, at least some of the functions of the power management module 310 may be performed by the processor 350.

According to an embodiment, the battery 330 (e.g., the battery 189 in FIG. 1) may supply power to at least one element of the electronic device 300. In an embodiment, the battery 330 may be charged by the power supplied from the power management module 310. In an embodiment, the battery 330 may be discharged by the consumed current (e.g., a current for execution of an application) of the electronic device 300. In an embodiment, the battery 330 may correspond to a rechargeable second battery.

According to an embodiment, the processor 350 (e.g., the processor 120 in FIG. 1) may adjust the power supplied to the battery 330 via the power management module 310. In an embodiment, the processor 350 may configure multiple charging intervals up to the capacity of the battery 330 in a fully-charged state in order to charge the battery 330. In addition, the processor 350 may configure different charging currents for the respective configured charging intervals. For example, the processor 350 may configure multiple charging intervals including a first charging interval having a first target current configured up to a 30% state of charge of the battery 330, a second charging interval having a second target current configured up to a 65% state of charge of the battery 330, and a third charging interval having a third target current configured up to a 100% state of charge of the battery 330.

According to an embodiment, the processor 350 may configure the configured multiple charging intervals to correspond to the deteriorated state of the battery 330. For example, the processor 350 may configure multiple charging intervals by adjusting a target current in a constant current (CC) interval and a constant voltage (CV) interval included in each of the configured charging interval.

According to an embodiment, the processor 350 and/or the power management module 310 may calculate the deteriorated state of the battery 330, based on at least one of the current, the voltage, the temperature, the resistance, the charging count, and the discharging count of the battery 330.

According to an embodiment, the processor 350 may maintain a charging current at a first constant current (e.g., 7500 mA) in one charging interval (e.g., the first charging interval) among multiple charging intervals configured based on a target current and/or a target voltage. In an embodiment, the processor 350 may identify whether, in the one charging interval, a charging voltage reaches a first target voltage (e.g., 4.13 V) from a first charging voltage (e.g., 4 V) due to the charging current maintained at the first constant current. In an embodiment, when the charging voltage has reached the first target voltage from the first charging voltage, the processor 350 may convert the charging current into a first charging current changed (e.g., changed by a downward inclination) from the first constant current. In an embodiment, the processor 350 may identify whether the charging current reaches a first target current (e.g., 5400 mA) adjusted from the first charging current. In an embodiment, when the charging current has reached the first target current adjusted from the first charging current, the processor 350 may convert the charging current from the first charging current into a second constant current (e.g., 5400 mA) corresponding to the first target current. In an embodiment, the processor 350 may enter a different charging interval (e.g., the second charging interval after the first charging interval) from the one charging interval among the configured multiple charging intervals, based on the charging current converted into the second constant current.

According to an embodiment, the processor 350 may identify, in one charging interval (e.g., the first charging interval) among multiple charging intervals configured based on a target current and/or a target voltage, whether a charging current reaches a corresponding target current of the one charging interval, based on the system current consumed in the electronic device 300. For example, in case that an application is executed in the electronic device 300, the processor 350 may, based on whether a sum of the current (e.g., the consumed current of a system) consumed by execution of the application and a charging current (e.g., a charging current supplied to the battery 330) of the one charging interval corresponds to a corresponding target current, identify whether the charging current reaches the corresponding target current.

According to an embodiment, the processor 350 may adjust a corresponding target voltage and/or a corresponding target current for each charging interval among the configured multiple charging intervals, based on whether the charging count and/or the discharging count of the battery 330 corresponds to a designated number. For example, whether the charging count and/or the discharging count of the battery 330 is equal to or greater than a designated first number (e.g., 300 times), the processor 350 may adjust a corresponding target voltage and/or a corresponding target current for each of the charging intervals, based on a first configuration. The first configuration may be a configuration for adjusting a corresponding target voltage and/or a corresponding target current of each of the first charging interval to the third charging interval. In an embodiment, the processor 350 may gradually lower a corresponding target voltage and/or a corresponding target current for each of the charging intervals as the charging count and/or the discharging count of the battery 330 gets larger.

According to various embodiments, at least some functions of the processor 350 described above may be performed by the power management module 310. For example, the power management module 310 may convert a charging current into a charging current changed from a constant current and/or convert a charging voltage into a constant current from a changed charging voltage in at least one charging interval (e.g., the first charging interval) among multiple charging intervals configured based on a target current and/or a target voltage.

Figure 4:
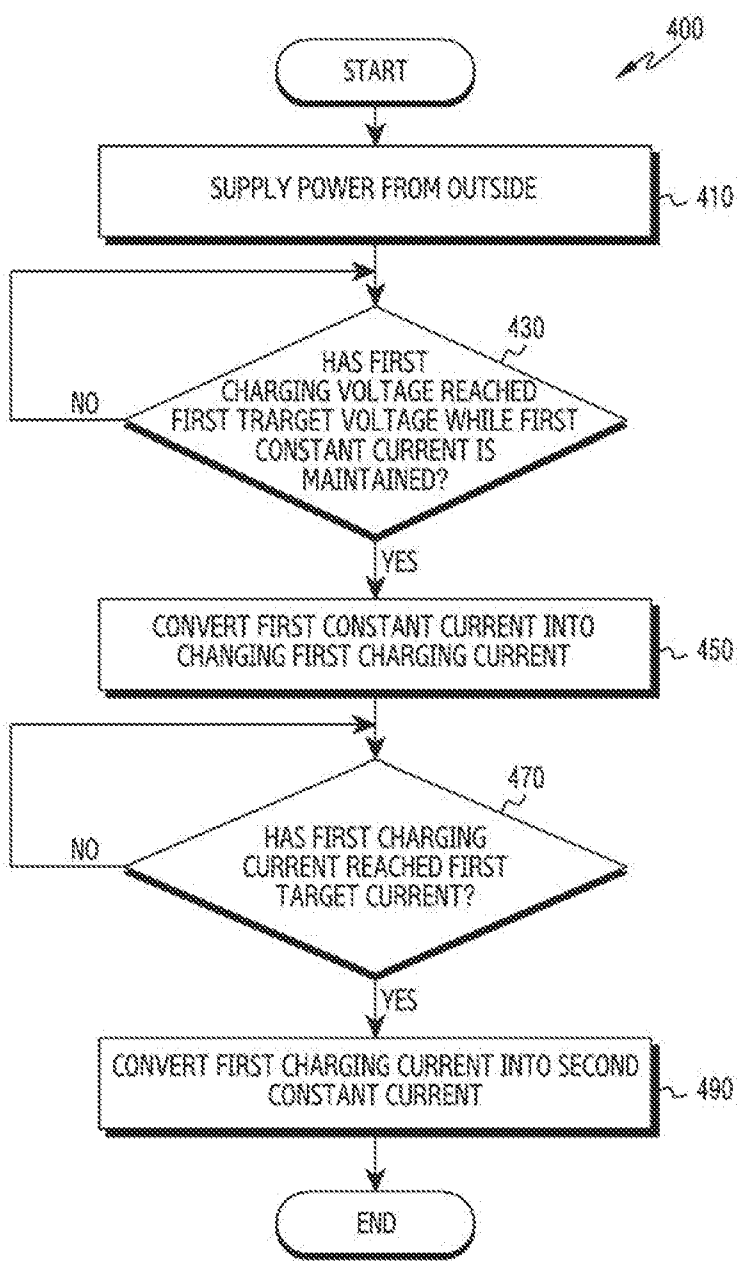
FIG. 4 is a flowchart illustrating a method for charging a battery in an electronic device according to an embodiment.

FIG. 4 is a flowchart illustrating a method 400 for charging a battery in an electronic device according to an embodiment.

Referring to FIG. 4, the electronic device 300 (e.g., the electronic device 300 in FIG. 3) may perform operation 410 to operation 490 to adjust a target current in a CC interval and a CV interval included in each of the configured multiple charging intervals according to a deteriorated state of a battery (e.g., the battery 330 in FIG. 3) so as to configure multiple charging intervals.

Referring to operation 410, the electronic device 300 may charge the battery 330, based on the power supplied from the outside. In operation 410, in the electronic device 300, an external cause (e.g., impedance increase) may be applied in a process of charging the battery 330 due to a deteriorated state.

Referring to operation 430, the electronic device 300 may maintain a charging current at a first constant current (e.g., 7500 mA) in one charging interval (e.g., the first charging interval) among multiple charging intervals configured based on a target current and/or a target voltage, and then identify whether a charging voltage reaches a first target voltage (e.g., 4.13 V) adjusted from a first charging voltage (e.g., 4 V). For example, in operation 430, in case that the charging voltage reaches, in the one charging interval, the first target voltage (e.g., 4.13 V) adjusted from the first charging voltage (e.g., 4 V) due to the charging current maintained at the first constant current, the electronic device 300 may perform operation 450. As another example, in case that the charging voltage does not reach, in the one charging interval, the first target voltage (e.g., 4.13 V) adjusted from the first charging voltage (e.g., 4 V) due to the charging current maintained at the first constant current, the electronic device 300 may repeatedly perform operation 430.

Referring to operation 450, in case that the charging voltage has reached, in the one charging interval, the first target voltage (e.g., 4.13 V) adjusted from the first charging voltage (e.g., 4 V) due to the charging current maintained at the first constant current, the electronic device 300 may convert the charging current into a first charging current changed (e.g., changed by a downward inclination) from the first constant current. The first charging current changed from the first constant current may be a first charging current adjusted by impedance increase in the one charging interval.

Referring to operation 470, the electronic device 300 may identify whether the charging current reaches a first target current (e.g., 5400 mA) adjusted from the first charging current. The electronic device 300 may, for example, operation 470, identify whether the charging current reaches the first target current adjusted from the first charging current until a time point at which the charging voltage is maintained at the adjusted first target voltage. For example, in case that the charging current has reached the first target current adjusted from the first charging current, the electronic device 300 may perform operation 490. As another example, in case that the charging current does not reach the first target current adjusted from the first charging current, the electronic device 300 may repeatedly perform operation 470.

Referring to operation 490, in case that the charging current has reached the first target current adjusted from the first charging current, the electronic device 300 may convert the charging current into a second constant current (e.g., 5400 mA). The second constant current may be a current corresponding to the first target current. The electronic device 300 may, for example, after operation 490, maintain the second constant current to enter a different charging interval after the one charging interval from the one charging interval.

Figure 5:
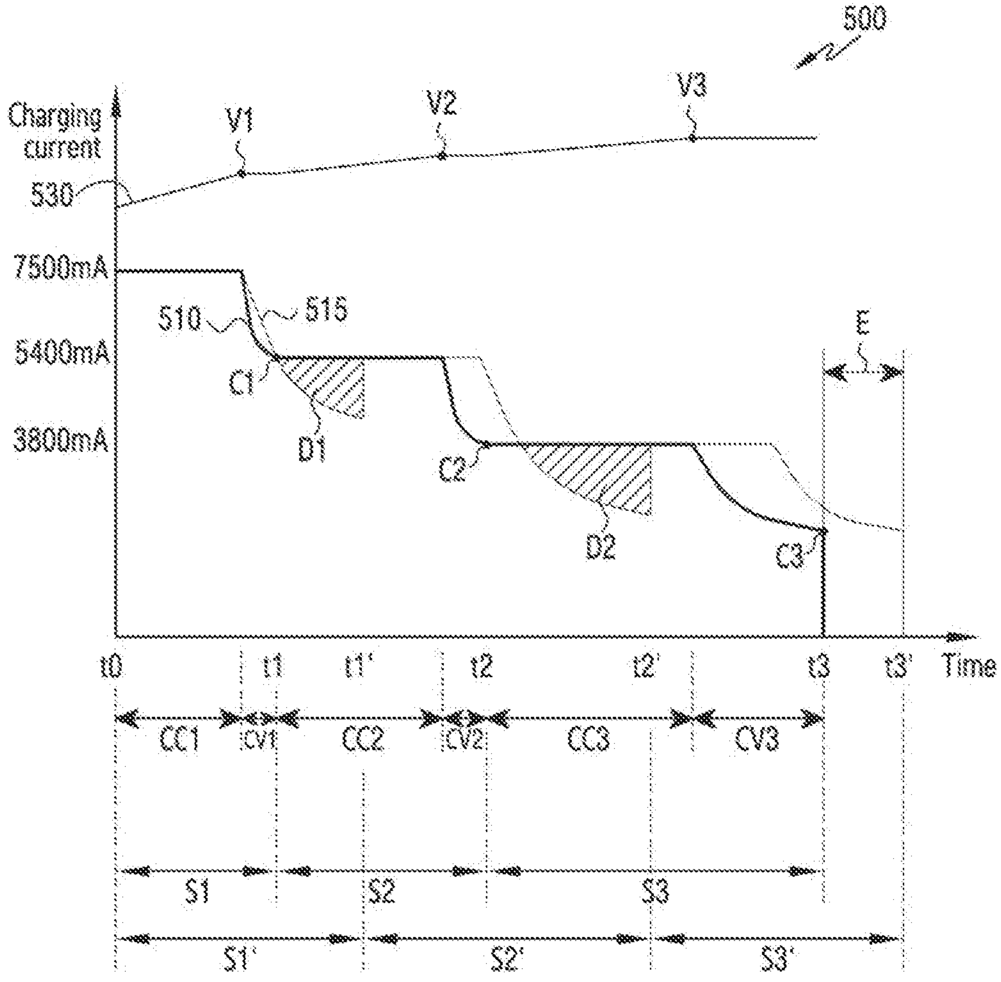
FIG. 5 is a graph showing charging intervals of a battery, configured based on a charging current and a charging voltage in an electronic device according to an embodiment.

FIG. 5 illustrates a graph showing charging intervals of a battery, configured based on a charging current and a charging voltage in an electronic device according to an embodiment.

Referring to FIG. 5, an electronic device (e.g., the electronic device 300 in FIG. 3) may configure a charging interval for the power introduced from the outside to a battery (e.g., the battery 330 in FIG. 3), based on a charging current 510 and/or a charging voltage 530. The charging current 510 may, for example, reach an adjusted target current early in a charging interval configured based on the charging current 510 and/or the charging voltage 530 unlike an initial charging current 515 in multiple charging intervals (which may be referred to as initial charging intervals) (e.g., S1'-S3') configured based on the state of charge of the battery 330.

In a configured first charging interval S1, the electronic device 300 may maintain the charging current 510 at a first constant current (7500 mA). In the configured first charging interval S1, the electronic device 300 may maintain the charging current 510 at a first constant current (7500 mA) until, for example, a time point (a time point before t1) at which the charging voltage 530 reaches a first target voltage V1 from a first charging voltage (e.g., 4 V). In an embodiment, the electronic device 300 may configure, as a first CC interval CC1, the interval for which the charging current 510 is maintained at the first constant current (7500 mA).

In the configured first charging interval S1, in case that the charging voltage 530 has reached the first target voltage V1, the electronic device 300 may convert the charging current 510 into a first charging current changed from the first constant current (7500 mA). In the configured first charging interval S1, the electronic device 300 may maintain the charging current 510 at the first charging current until, for example, a time point t1 at which the charging current 510 reaches a first target current C1 from the first charging current. The first charging current may be changed at a downward inclination before entering a second charging interval S2. In the configured first charging interval S1, the electronic device 300 may maintain the charging voltage 530 at a first constant voltage (e.g., 4.13 V) corresponding to the first target voltage until the time point t1 at which the charging current 510 reaches the first target current C1 from the first charging current. In an embodiment, the electronic device 300 may configure, as a first CV interval CV1, the interval for which the charging current 510 is maintained at the first charging current.

In a configured second charging interval S2, the electronic device 300 may maintain the charging current 510 having reached the first target current C1 at a second constant current (5400 mA). In the configured second charging interval S2, the electronic device 300 may, for example, maintain the charging voltage 530 having reached the first target voltage V1 at a second charging voltage so as to maintain the charging current 510 at the second constant current (5400 mA) until a time point (a time point before T2) at which the charging voltage 530 reaches a second target voltage V2 from the second charging voltage (e.g., 4.13V). In an embodiment, the electronic device 300 may configure, as a second CC interval CC2, the interval for which the charging current 510 is maintained at the second constant current (5400 mA).

In the configured second charging interval S2, in case that the charging voltage 530 has reached the second target voltage V2, the electronic device 300 may convert the charging current 510 into a second charging current changed from the second constant current. In the configured second charging interval S2, the electronic device 300 may maintain the charging current 510 at the second charging current until, for example, a time point t2 at which the charging current 510 reaches a second target current C2 from the second charging current. The second charging current may be changed at a downward inclination before entering a third charging interval S3. In the configured second charging interval S2, the electronic device 300 may maintain the charging voltage 530 at a second constant voltage (e.g., 4.3V) corresponding to the second target voltage until a time point t2 at which the charging current 510 reaches the second target current C2 from the second charging current. In an embodiment, the electronic device 300 may configure, as a second CV interval CV2, the interval for which the charging current 510 is maintained at the second charging current.

In a configured third charging interval S3, the electronic device 300 may maintain the charging current 510 having reached the second target current C2 at a third constant current (3800 mA). In the configured third charging interval S3, the electronic device 300 may, for example, maintain the charging voltage 530 having reached the second target voltage V2 at a third charging voltage so as to maintain the charging current 510 at the third constant current (3800 mA) until a time point (a time point before T3) at which the charging voltage 530 reaches a third target voltage V3 from the third charging voltage (e.g., 4.13V). In an embodiment, the electronic device 300 may configure, as a third CC interval CC3, the interval for which the charging current 510 is maintained at the third constant current (3800 mA).

In the configured third charging interval S3, in case that the charging voltage 530 has reached the third target voltage V3, the electronic device 300 may convert the charging current 510 into a third charging current changed from the third constant current. In the configured third charging interval S2, the electronic device 300 may maintain the charging current 510 at the third charging current until, for example, a time point t3 at which the charging current 510 reaches a third target current C3 from the third charging current. The third charging current may be changed at a downward inclination before the state of charge of the battery 330 reaches a fully-charged state. In the configured third charging interval S3, the electronic device 300 may maintain the charging voltage 530 at a third constant voltage (e.g., 4.35 V) corresponding to the third target voltage until the time point t3 at which the charging current 510 reaches the third target current C3 from the third charging current. In an embodiment, the electronic device 300 may configure, as a third CV interval CV3, the interval for which the charging current 510 is maintained at the third charging current.

According to an embodiment, the electronic device 300 may advance a time point of charging the battery 330 in multiple charging intervals S1-S3 configured based on the charging current 510 and/or the charging voltage 530, compared to a time point of charging the battery 330 in multiple charging intervals S1'-S3' configured based on the state of charge of the battery 330, thereby shortening the charging time of the battery 330 by a designated interval E according to the deteriorated state of the battery 330.

Figure 6:
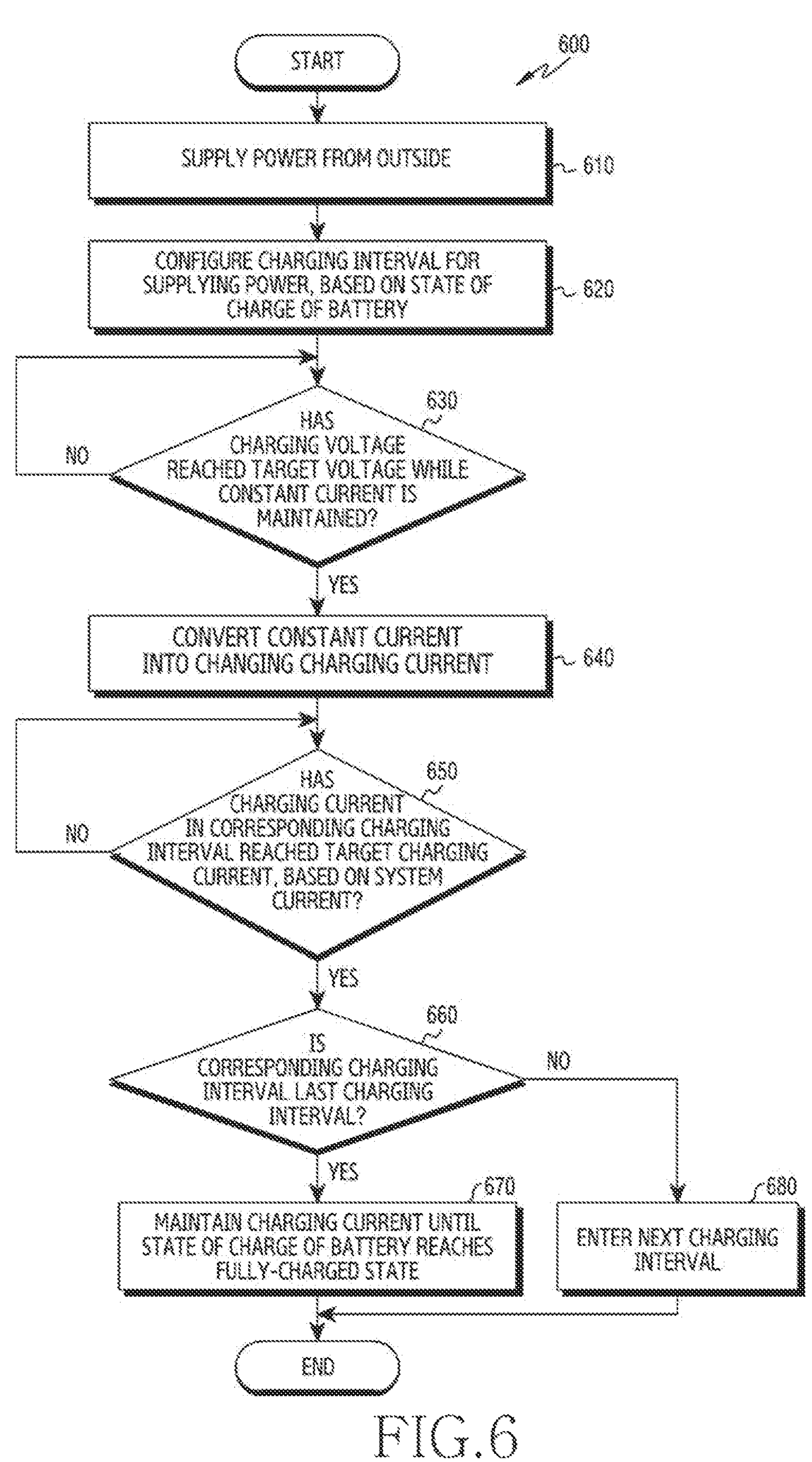
FIG. 6 is a flowchart illustrating a method for charging a battery in an electronic device according to an embodiment.

FIG. 6 is a flowchart illustrating a method 600 for charging a battery in an electronic device according to an embodiment.

Referring to FIG. 6, the electronic device 300 according to an embodiment may perform operation 610 to operation 680 to adjust a target current in a CC interval and a CV interval included in each of the configured multiple charging intervals according to a deteriorated state of a battery (e.g., the battery 330 in FIG. 3) so as to configure multiple charging intervals.

Referring to operation 610, in the electronic device 300, power may be supplied to the battery 330 from the outside via a power management module (e.g., the power management module 310 in FIG. 3). In operation 610, in the electronic device 300, an external cause (e.g., impedance increase) may be applied in a process of charging the battery 330 due to a deteriorated state.

Referring to operation 620, in case that power is supplied to the battery 330 from the outside via a power management module (e.g., the power management module 310 in FIG. 3), the electronic device 300 may configure a charging interval for supplying power to the battery 330, based on the state of charge of the battery 330. For example, in case that the state of charge of the battery 330 is 20%, the electronic device 300 may charge the battery 330 in a first charging interval (e.g., the first charging interval S1 in FIG. 5) among multiple charging intervals configured based on a target current and/or a target voltage.

Referring to operation 630, the electronic device 300 may maintain a charging current at a designated constant current (e.g., 7500 mA) in one charging interval (e.g., the first charging interval) among the configured multiple charging intervals, so as to identify whether a charging voltage reaches a target voltage (e.g., 4.13 V) adjusted from a designated charging voltage (e.g., 4 V). For example, in operation 630, in case that the charging voltage reaches, in the one charging interval, the target voltage (e.g., 4.13 V) adjusted from the designated charging voltage (e.g., 4 V) due to the charging current maintained at the designated constant current, the electronic device 300 may perform operation 640. As another example, in case that the charging voltage does not reach, in the one charging interval, the target voltage (e.g., 4.13 V) adjusted from the designated charging voltage (e.g., 4 V) due to the charging current maintained at the designated constant current, the electronic device 300 may repeatedly perform operation 630.

Referring to operation 640, in case that the charging voltage has reached, in the one charging interval, the target voltage (e.g., 4.13 V) adjusted from the designated charging voltage (e.g., 4 V) due to the charging current maintained at the designated constant current, the electronic device 300 may convert the charging current into a charging current changed (e.g., changed by a downward inclination) from the designated constant current. The charging current changed from the designated constant current may be a charging current adjusted by impedance increase in the one charging interval.

Referring to operation 650, the electronic device 300 may identify, based on a system current, whether the changing charging current reaches a target current (e.g., 5400 mA). The electronic device 300 may, for example, operation 650, identify whether a charging current obtained by adding the consumed current (e.g., a current for execution of an application) of the electronic device 300 reaches the target current adjusted from the designated charging current until a time point at which the charging voltage is maintained at the adjusted target voltage. For example, in case that charging current obtained by adding the consumed current has reached the target current adjusted from the designated charging current, the electronic device 300 may perform operation 660. As another example, in case that charging current obtained by adding the consumed current does not reach the target current adjusted from the designated charging current, the electronic device 300 may repeatedly perform operation 650.

Referring to operation 660, in case that charging current obtained by adding the consumed current has reached the target current adjusted from the designated charging current, the electronic device 300 may identify whether a corresponding charging interval is the last charging interval (e.g., the third charging interval S3 in FIG. 5). For example, in case that the corresponding charging interval is the last charging interval (e.g., the third charging interval S3 in FIG. 5) the electronic device 300 may perform operation 670. As another example, in case that the corresponding charging interval is not the last charging interval (e.g., the third charging interval S3 in FIG. 5), the electronic device 300 may perform operation 680.

Referring to operation 670, in case that the corresponding charging interval is the last charging interval, the electronic device 300 may maintain the charging current at a charging current having reached the adjusted target current until the SoC of the battery 330 reaches a fully-charged state.

Referring to operation 680, in case that the corresponding charging interval is not the last charging interval, the electronic device 300 may enter the next charging interval (e.g., the second charging interval S2 in FIG. 5) after the corresponding charging interval. After operation 680, the electronic device 300 may repeatedly perform operation 630 to operation 660 until a condition to perform operation 670 is satisfied.

Figure 7:
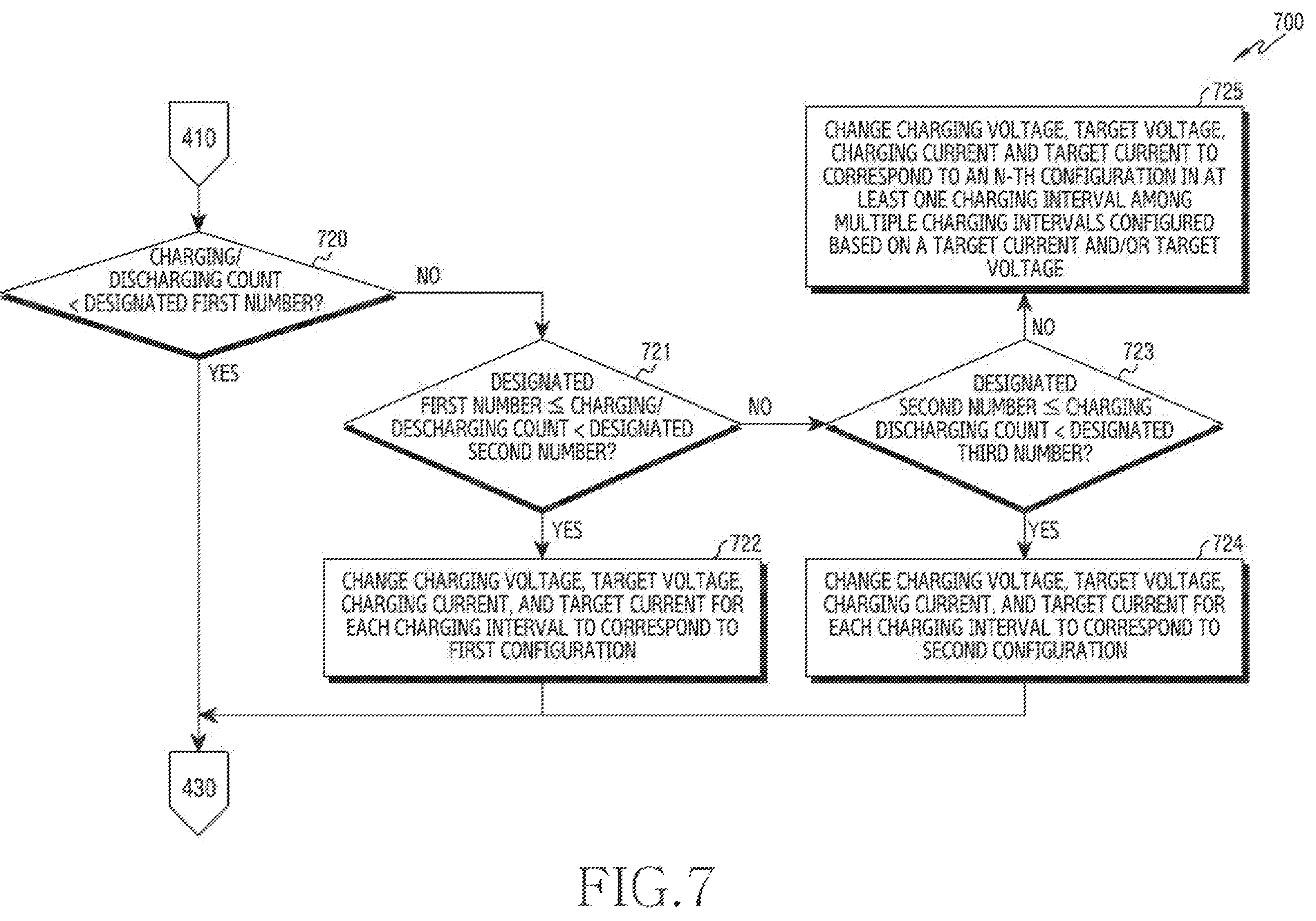
FIG. 7 is a flowchart illustrating a method for charging a battery in an electronic device according to an embodiment.

FIG. 7 is a flowchart illustrating a method 700 for charging a battery in an electronic device according to an embodiment.

According to an embodiment, the electronic device 300 (e.g., the electronic device 300 in FIG. 3) may perform operation 720 to operation 725 to adjust a corresponding target voltage and/or a corresponding target current for each charging interval among the configured multiple charging intervals, based on whether the charging count and/or discharging count of the battery 330 (e.g., the battery 330 in FIG. 3) corresponds to a designated number. In an embodiment, the electronic device 300 may perform operation 720 to operation 725 in operation 410 and operation 430 in FIG. 4.

Referring to operation 720, the electronic device 300 may identify whether the charging count and/or the discharging count of the battery 330 is less than a designated first number (e.g., 300 times). For example, in case that the charging count and/or the discharging count of the battery 330 is less than the designated first number, the electronic device 300 may perform operation 430 in FIG. 4. As another example, in case that the charging count and/or the discharging count of the battery 330 is equal to or greater than the designated first number, the electronic device 300 may perform operation 721.

Referring to operation 721, the electronic device 300 may identify whether the charging count and/or the discharging count of the battery 330 is equal to or greater than the designated first number and is less than a designated second number (e.g., 400 times). For example, in case that the charging count and/or the discharging count of the battery 330 is equal to or greater than the designated first number and is less than the designated second number, the electronic device 300 may perform operation 722. As another example, in case that the charging count and/or the discharging count of the battery 330 is equal to or greater than the designated second number, the electronic device 300 may perform operation 723.

Referring to operation 722, in case that the charging count and/or the discharging count of the battery 330 is equal to or greater than the designated first number and is less than the designated second number, the electronic device 300 may change a charging voltage, a target voltage, a charging current, and a target current to correspond to a first configuration in at least one charging interval among multiple charging intervals configured based on a target current and/or a target voltage. The first configuration may be, for example, a configuration for adjusting the charging voltage, the target voltage, the charging current, and the target current of at least one interval among a first charging interval to a third charging interval (e.g., the first charging interval S1 to the third charging interval S3 in FIG. 5).

Referring to operation 723, the electronic device 300 may identify whether the charging count and/or the discharging count of the battery 330 is equal to or greater than the designated second number and is less than a designated third number (e.g., 700 times). For example, in case that the charging count and/or the discharging count of the battery 330 is equal to or greater than the designated second count and is less than the designated third number, the electronic device 300 may perform operation 724. As another example, in case that the charging count and/or the discharging count of the battery 330 is equal to or greater than the designated third number, the electronic device 300 may perform operation 725.

Referring to operation 724, in case that the charging count and/or the discharging count of the battery 330 is equal to or greater than the designated second number and is less than the designated third number, the electronic device 300 may change a charging voltage, a target voltage, a charging current, and a target current to correspond to a second configuration in at least one charging interval among multiple charging intervals configured based on a target current and/or a target voltage. The second configuration may be, for example, a configuration for adjusting the charging voltage, the target voltage, the charging current, and the target current of at least one interval among the first charging interval to the third charging interval (e.g., the first charging interval S1 to the third charging interval S3 in FIG. 5) to be a configuration lower than the first configuration.

Referring to operation 725, in case that the charging count and/or the discharging count of the battery 330 is equal to or greater than the designated third number, the electronic device 300 may change a charging voltage, a target voltage, a charging current, and a target current to correspond to the n-th configuration in at least one charging interval among multiple charging intervals configured based on a target current and/or a target voltage. The n-th configuration may be, for example, a configuration for adjusting the charging voltage, the target voltage, the charging current, and the target current of at least one interval among the first charging interval to the third charging interval (e.g., the first charging interval S1 to the third charging interval S3 in FIG. 5) to be a configuration lower than the second configuration.

In an embodiment, the electronic device 300 may gradually lower a charging voltage, a target voltage, a charging current, and a target current for each of the configured multiple charging intervals as the charging count and/or the discharging count of the battery 330 gets larger. For example, in case that the charging count and/or the discharging count of the battery 330 is equal to or greater than the designated first number and is less than the designated second number, the electronic device 300 may adjust the first target voltage to 4120 mV and adjust the first target current to 5300 mA in the first charging interval S1, may adjust the second target voltage to 4290 mV and adjust the second target current to 3700 mA in the second charging interval S2, and may adjust the third target voltage to 4340 mV in the third charging interval S3. As another example, in case that the charging count and/or the discharging count of the battery 330 is equal to or greater than the designated second number and is less than the designated third number, the electronic device 300 may adjust the first target voltage to 4110 mV and adjust the first target current to 5200 mA in the first charging interval S1, may adjust the second target voltage to 4280 mV and adjust the second target current to 3600 mA in the second charging interval S2, and may adjust the third target voltage to 4330 mV in the third charging interval S3. In an embodiment, the electronic device 300 may adjust a charging voltage and a charging current to correspond to a corresponding target voltage and a corresponding target current adjusted based on the charging count and/or the discharging count of the battery 330 described above.

Figure 8:
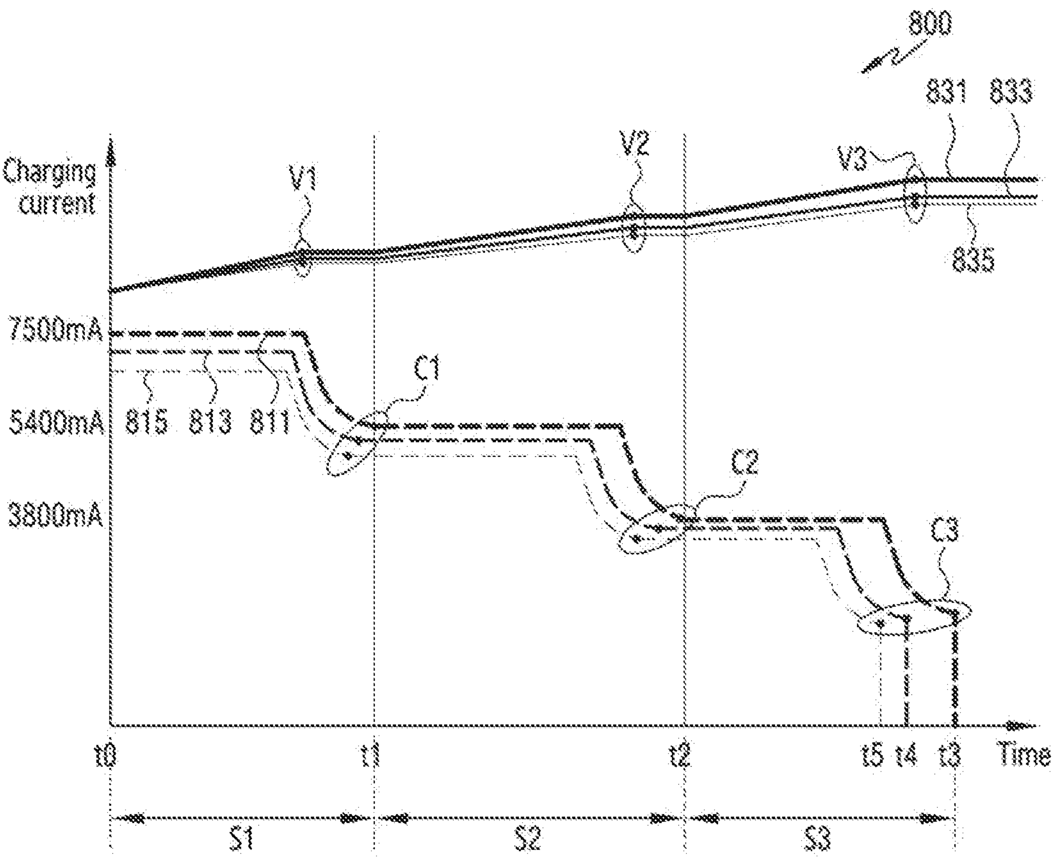
FIG. 8 is a graph showing multiple different target voltages and/or multiple different target currents configured for multiple charging intervals, based on a charging count and/or a discharging count of a battery in an electronic device according to an embodiment.

FIG. 8 illustrates a graph showing multiple different target voltages and/or multiple different target currents configured for multiple charging intervals, based on a charging count and/or a discharging count of a battery in an electronic device according to an embodiment.

Referring to FIG. 8, an electronic device (e.g., the electronic device 300 in FIG. 3) may adjust a corresponding target voltage and/or a corresponding target current for each charging interval among the configured multiple charging intervals, based on whether the charging count and/or the discharging count of the battery 330 corresponds to a designated number. For example, the processor 350 may gradually reduce a corresponding target voltage V1, V2, or V3 and/or a corresponding target current C1, C2, or C3 for each of the charging intervals as the charging count and/or the discharging count of the battery 330 gets larger.

In the configured first charging interval S1 to third charging interval S3, the electronic device 300 may configure the target currents C1, C2, and C3 of a first charging current 811 for the configured first charging interval S1 to third charging interval S3, respectively. For example, in case that the charging count and/or the discharging count of the battery 330 is equal to or greater than a designated first number (e.g., 300 times), the electronic device 300 may maintain the target currents C1, C2, and C3 of the first charging current 811 to be in an initial state for the configured first charging interval S1 to third charging interval S3. In the configured first charging interval S1 to third charging interval S3, the electronic device 300 may configure a first charging voltage 831 corresponding to the first charging current 811. For example, in case that the charging count and/or the discharging count of the battery 330 is less than the designated first number (e.g., 300 times), the electronic device 300 may maintain the target voltages V1, V2, and V3 of the first charging voltage 831 to be in an initial state for the configured first charging interval S1 to third charging interval S3.

In the configured first charging interval S1 to third charging interval S3, the electronic device 300 may configure the target currents C1, C2, and C3 of a second charging current 813 for the configured first charging interval S1 to third charging interval S3, respectively. For example, in case that the charging count and/or the discharging count of the battery 330 is equal to or greater than the designated first number and is less than a designated second number (e.g., 400 times), the electronic device 300 may convert the target currents C1, C2, and C3 of the second charging current 813 into target currents lower than the target currents of the initial state for the configured first charging interval S1 to third charging interval S3. In the configured first charging interval S1 to third charging interval S3, the electronic device 300 may configure a second charging voltage 833 corresponding to the second charging current 813. For example, in case that the charging count and/or the discharging count of the battery 330 is equal to or greater than the designated first number and is less than the designated second number, the electronic device 300 may convert the target voltages V1, V2, and V3 of the second charging voltage 833 into target voltages lower than the target voltages of the initial state for the configured first charging interval S1 to third charging interval S3.

In the configured first charging interval S1 to third charging interval S3, the electronic device 300 may configure the target currents C1, C2, and C3 of a third charging current (e.g., charging current 515) for the configured first charging interval S1 to third charging interval S3, respectively. For example, in case that the charging count and/or the discharging count of the battery 330 is equal to or greater than the designated second number and is less than a designated third number (e.g., 700 times), the electronic device 300 may convert the target currents C1, C2, and C3 of the third charging current 815 into target currents lower than a second target current for the configured first charging interval S1 to third charging interval S3. In the configured first charging interval S1 to third charging interval S3, the electronic device 300 may configure a third charging voltage 835 corresponding to the third charging current. For example, in case that the charging count and/or the discharging count of the battery 330 is equal to or greater than the designated second number and is less than the designated third number, the electronic device 300 may convert the target voltages V1, V2, and V3 of the third charging voltage 835 into target voltages lower than a second target voltage for the configured first charging interval S1 to third charging interval S3.

According to an embodiment, the electronic device 300 may gradually reduce a corresponding target voltage V1, V2, or V3 and/or a corresponding target current C1, C2, or C3 for each of the charging intervals S1, S2, or S3 as the charging count and/or the discharging count of the battery 330 gets larger, so that the charging time of the battery 330 may be gradually reduced. For example, in case that the charging count and/or the discharging count is less than the designated first number (e.g., 300 times), the electronic device 300 may complete charging of the battery 330 at a third time point t3, based on a target voltage V1, V2, or V3 of an initial state and/or a target current C1, C2, or C3 of an initial state. As another example, in case that the charging count and/or the discharging count is equal to or greater than the designated first number and is less than the designated second number (e.g., 400 times), the electronic device 300 may complete charging of the battery 330 at a fourth time point t4 earlier than the third time point t3, based on a target voltage V1, V2, or V3 and/or a target current C1, C2, or C3 lower than a charging voltage V1, V2, or V3 of an initial state and/or a charging current C1, C2, or C3 of an initial state.

According to various embodiments, an electronic device (e.g., the electronic device 300 in FIG. 3) may include a battery (e.g., the battery 330 in FIG. 3), and a processor (e.g., the processor 350 in FIG. 3) electrically connected to the battery, where the processor 350 is configured to, while maintaining a charging current (e.g., the charging current 510 in FIG. 5) at a first constant current, identify whether a charging voltage (e.g., the charging voltage 530 in FIG. 5) reaches a first target voltage (e.g., the first target voltage V1 in FIG. 5) from a first charging voltage, when the charging voltage 530 has reached the first target voltage V1 from the first charging voltage, convert the charging current 510 into a first charging current changed from the first constant current, identify whether the charging current 510 reaches a first target current (e.g., the first target current C1 in FIG. 5) from the first charging current, and when the charging current 510 has reached the first target current C1 from the first charging current, convert the charging current 510 into a second constant current corresponding to the first target current C1 from the first charging current.

According to various embodiments, the processor 350 may be configured to, when the charging voltage 530 has reached the first target voltage V1 from the first charging voltage, convert the charging voltage 530 from the first charging voltage to a first constant voltage corresponding to the first target voltage V1, and while the first constant voltage is maintained, identify whether the charging current 510 reaches the first target current C1 from the first charging current.

According to various embodiments, the processor 350 may be configured to, based on a current consumed in the electronic device 300, identify whether the charging current 510 reaches the first target current C1 from the first charging current.

According to various embodiments, the processor 350 may be configured to designate multiple charging intervals (e.g., the multiple charging intervals S1, S2, and S3 in FIG. 3), based on at least one of multiple target voltages (e.g., the multiple target voltages V1, V2, and V3 in FIG. 3) including the first target voltage V1 and multiple target currents (e.g., the multiple target currents C1, C2, and C3 in FIG. 3) including the first target current C1.

According to various embodiments, the processor 350 may be configured to distinguish the multiple charging intervals S1, S2, and D3 independent of a SOC of the battery 330.

According to various embodiments, the processor 350 may be configured to, when the charging current 510 is converted to the second constant voltage from the first charging current, enter a second charging interval S2 after a first charging interval S1 from the first charging interval S1 among the multiple charging intervals S1, S2, and S3.

According to various embodiments, the processor 350 may be configured to, when the second charging interval S2 is entered into from the first charging interval S1, convert the charging voltage 530 into a second charging voltage changed from the first constant voltage while the second constant current is maintained in the second charging interval S2, and maintain the charging current 510 at the second constant current while the second charging voltage is maintained.

According to various embodiments, a time point (e.g., the first time point t1 in FIG. 5) of entrance into the second charging interval S2 from the first charging interval S1 may be earlier than a time point (e.g., the different first time point t1' in FIG. 5) at which a charging current (e.g., the charging current 515 in FIG. 5) is converted from a first charging current into a second constant current, according to a state of charge of the battery 330 in different multiple charging intervals (e.g., the different multiple charging intervals S1', S2', and S3' in FIG. 5) distinguished according to the state of charge of the battery 330.

According to various embodiments, the processor 350 may be configured to identify whether at least one count among a charging count and a discharging count of the battery 330 corresponds to a designated number, and when the at least one count corresponds to the designated number, adjust at least one of the multiple target voltages (e.g., the multiple target voltages V1, V2, and V3 in FIG. 8) and the multiple target currents (e.g., the multiple target currents C1, C2, and C3 in FIG. 8) for each of the multiple charging intervals (e.g., the multiple charging intervals S1, S2, and S3 in FIG. 8).

According to various embodiments, the first target current C1 may have a current lower than the first constant current.

According to various embodiments, a battery charging method (e.g., the battery charging method 400 in FIG. 4) may include identifying whether a charging voltage (e.g., the charging voltage 530 in FIG. 5) reaches a first target voltage (e.g., the first target voltage V1 in FIG. 5) from a first charging voltage while maintaining the charging current 510 at a first constant current (e.g., operation 430 in FIG. 4), when the charging voltage (e.g., the charging voltage 530 in FIG. 5) has reached the first target voltage (e.g., the first target voltage V1 in FIG. 5) from the first charging voltage, converting the charging current (e.g., the charging current 510 in FIG. 5) into a first charging current changed from the first constant current (e.g., operation 450 in FIG. 4), identifying whether the charging current (e.g., the charging current 510 in FIG. 5) reaches a first target current (e.g., the first target current C1 in FIG. 5) from the first charging current (e.g., operation 470 in FIG. 4), and when the charging current (e.g., the charging current 510 in FIG. 5) has reached the first target current (e.g., the first target current C1 in FIG. 5) from the first charging current, converting the charging current (e.g., the charging current 510 in FIG. 5) from the first charging current into a second constant current corresponding to the first target current (e.g., the first target current C1 in FIG. 5) (e.g., operation 490 in FIG. 4).

According to various embodiments, the identifying of whether the charging current (e.g., the charging current 510 in FIG. 5) reaches the first target current e.g., (the first target current C1 in FIG. 5) from the first charging current (e.g., operation 430) may include converting the charging voltage (e.g., the charging voltage 530 in FIG. 5) from the first charging voltage to a first constant voltage corresponding to the first target voltage (e.g., the first target voltage V1 in FIG. 5) when the charging voltage (e.g., the charging voltage 530 in FIG. 5) has reached the first target voltage (e.g., the first target voltage V1 in FIG. 5) from the first charging voltage, and may be performed while the first constant voltage is maintained.

According to various embodiments, the identifying of whether the charging current (e.g., the charging current 510 in FIG. 5) reaches the first target current (e.g., the first target current C1 in FIG. 5) from the first charging current (e.g., operation 470) includes identifying whether the charging current (e.g., the charging current 510 in FIG. 5) reaches the first target current (e.g., the first target current C1 in FIG. 5) from the first charging current, based on a current consumed in the electronic device 300.

According to various embodiments, the method may include designating multiple charging intervals (e.g., the multiple charging intervals S1, S2, and S3 in FIG. 5), based on at least one of multiple target voltages (e.g., the multiple target voltages V1, V2, and V3 in FIG. 5) including the first target voltage (e.g., the first target voltage V1 in FIG. 5) and multiple target currents (e.g., the multiple target currents C1, C2, and C3 in FIG. 5) including the first target current (e.g., the first target current C1 in FIG. 5).

According to various embodiments, the designating of the multiple charging intervals (e.g., the multiple charging intervals S1, S2, and S3 in FIG. 5) may include distinguishing the multiple charging intervals (e.g., the multiple charging intervals S1, S2, and S3 in FIG. 5) regardless of a SoC of the battery 330.

According to various embodiments, the method may include entering a second charging interval (e.g., the second charging interval S2 in FIG. 5) after a first charging interval (e.g., the first charging interval S1 in FIG. 5) from the first charging interval (e.g., the first charging interval S1 in FIG. 5) among the multiple charging intervals (e.g., the multiple charging intervals S1, S2, and S3 in FIG. 5) when the charging current (e.g., the charging current 510 in FIG. 5) is converted to the second constant voltage from the first charging current (e.g., operation 680 in FIG. 6).

According to various embodiments, the entering of the second charging interval (e.g., the second charging interval S2 in FIG. 5) from the first charging interval (e.g., the first charging interval S1 in FIG. 5) (e.g., operation 680 in FIG. 6) may include converting the charging voltage (e.g., the charging voltage 530 in FIG. 5) into a second charging voltage changed from the first constant voltage while the second constant current is maintained in the second charging interval (e.g., the second charging interval S2 in FIG. 5), and maintaining the charging current (e.g., the charging current 510 in FIG. 5) at the second constant current while the second charging voltage is maintained.

According to various embodiments, a time point (e.g., the first time point t1 in FIG. 5) of entrance into the second charging interval (e.g., the second charging interval S2 in FIG. 5) from the first charging interval (e.g., the first charging interval S1 in FIG. 5) may be earlier than a time point (e.g., the different first time point t1' in FIG. 5) at which a charging current (e.g., the charging current 515 in FIG. 5) is converted from a first charging current into a second constant current, based on a state of charge of the battery 330 in different multiple charging intervals (e.g., the different multiple charging intervals S1', S2', and S3' in FIG. 5) distinguished according to the state of charge of the battery 330.

According to various embodiments, the method may include identifying whether at least one count among a charging count and a discharging count of the battery 330 corresponds to a designated number (e.g., operation 720, operation 721, or operation 723 in FIG. 7), and adjusting at least one of the multiple target voltages (e.g., the multiple target voltages V1, V2, and V3 in FIG. 8) and the multiple target currents (e.g., the multiple target currents C1, C2, and C3 in FIG. 8) for each of the multiple charging intervals (e.g., the multiple charging intervals S1, S2, and S3 in FIG. 8) when the at least one count corresponds to the designated number (e.g., operation 722 or operation 724 in FIG. 7).

According to various embodiments, the first target current (e.g., the first target current C1 in FIG. 5) may have a current lower than the first constant current.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to embodiments thereof, it will be understood that various changes in form and details may be made therein without departing from the spirit and scope of the following claims.

What is claimed is:

1. An electronic device comprising:
a battery; and
a processor configured to:
while maintaining a charging current at a first constant current, identify whether a charging voltage reaches a first target voltage;
based on identifying that the charging voltage has reached the first target voltage, convert the charging current to a first changing charging current from the first constant current;
identify whether the charging current converted to the first changing charging current reaches a first target current;
based on identifying that the charging current converted to the first changing charging current has reached the first target current, convert the charging current from the first changing charging current to a second constant current corresponding to the first target current,
identify whether at least one count among a charging count and a discharging count of the battery is greater than a designated number; and
based on identifying that the at least one count is greater than a designated number, decrease at least one of the first target voltage and the first target current.

2. The electronic device of claim 1, wherein the processor is further configured to:
based on identifying that the charging voltage has reached the first target voltage, convert the charging voltage to a first constant voltage corresponding to the first target voltage; and
while the first constant voltage is maintained, identify whether the charging current converted to the first changing charging current reaches the first target current.

3. The electronic device of claim 1, wherein the processor is further configured to, based on a current consumed in the electronic device, identify whether the charging current converted to the first changing charging current reaches the first target current.

4. The electronic device of claim 1, wherein the processor is further configured to designate multiple charging intervals, based on at least one of:
multiple target voltages comprising the first target voltage, and
multiple target currents comprising the first target current.

5. The electronic device of claim 4, wherein the processor is further configured to distinguish the multiple charging intervals independent of a state of charge of the battery.

6. The electronic device of claim 4, wherein the multiple charging intervals comprise a first charging interval and a second charging interval, and
wherein the processor is further configured to, based on the charging current being converted to the second constant current from the first changing charging current, enter the second charging interval after the first charging interval.

7. The electronic device of claim 6, wherein the processor is further configured to:
based on the second charging interval being entered into from the first charging interval, convert the charging voltage to a second charging voltage while the second constant current is maintained in the second charging interval; and
maintain the charging current at the second constant current while the second charging voltage is maintained.

8. The electronic device of claim 6, wherein a first time point from entering the second charging interval is earlier than a second time point at which the charging current is converted from the first changing charging current into the second constant current.

9. The electronic device of claim 4, wherein the processor is further configured to:
based on identifying that the at least one count is greater than the designated number, adjust at least one of the multiple target voltages and the multiple target currents for each of the multiple charging intervals.

10. The electronic device of claim 1, wherein the first target current is lower than the first constant current.

11. A method of charging a battery, the method comprising:
identifying whether a charging voltage reaches a first target voltage while maintaining a charging current at a first constant current;
based on identifying that the charging voltage has reached the first target voltage, converting the charging current into a first changing charging current from the first constant current;
identifying whether the charging current converted to the first changing charging current reaches a first target current;
based on identifying that the charging current converted to the first changing charging current has reached the first target current, converting the charging current from the first changing charging current to a second constant current corresponding to the first target current,
identifying whether at least one count among a charging count and a discharging count of the battery is greater than a designated number; and
based on identifying that the at least one count is greater than a designated number, decreasing at least one of the first target voltage and the first target current.

12. The method of claim 11, wherein the identifying whether the charging current reaches the first target current comprises:
based on identifying that the charging voltage has reached the first target voltage, converting the charging voltage to a first constant voltage corresponding to the first target voltage; and
while the first constant voltage is maintained, identifying whether the charging current converted to the first changing charging current reaches the first target current.

13. The method of claim 11, wherein the identifying whether the charging current reaches the first target current comprises identifying whether the charging current converted to the first changing charging current reaches the first target current, based on a current consumed in an electronic device.

14. The method of claim 11, further comprising designating multiple charging intervals, based on at least one of:
multiple target voltages comprising the first target voltage; and
multiple target currents comprising the first target current.

15. The method of claim 14, wherein the designating of the multiple charging intervals comprises distinguishing the multiple charging intervals independent of a state of charge of the battery.

16. The method of claim 14, wherein the multiple charging intervals comprises a first charging interval and a second charging interval, and the method further comprising, based on the charging current being converted to the second constant current from the first changing charging current, entering the second charging interval after the first charging interval.

17. The method of claim 16, further comprising:

based on the second charging interval being entered into from the first charging interval, converting the charging voltage to a second charging voltage while the second constant current is maintained in the second charging interval; and maintaining the charging current at the second constant current while the second charging voltage is maintained.

18. The method of claim 16, wherein a first time point from entering the second charging interval is earlier than a second time point at which the charging current is converted from the first changing charging current into the second constant current.

19. The method of claim 14, further comprising:

based on identifying that the at least one count is greater than the designated number, adjusting at least one of the multiple target voltages and the multiple target currents for each of the multiple charging intervals.

20. The method of claim 11, wherein the first target current is lower than the first constant current.

* * * * *